July 19, 1927.
C. H. TOMLINSON
1,636,157
CAR AND AIR COUPLING MECHANISM
Filed Sept. 25. 1924   2 Sheets-Sheet 2
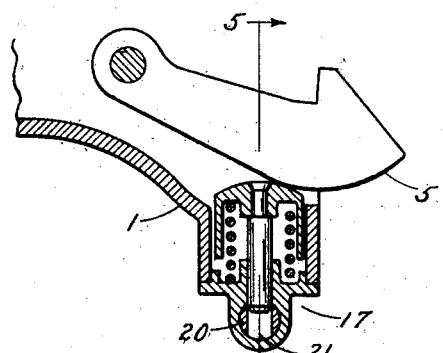
Fig. 3
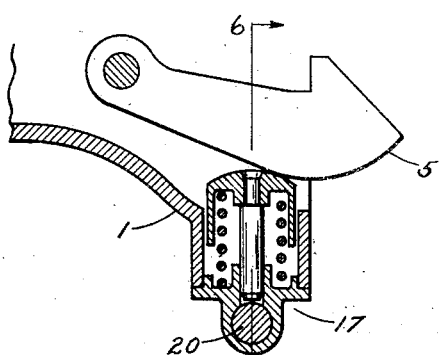
Fig. 4
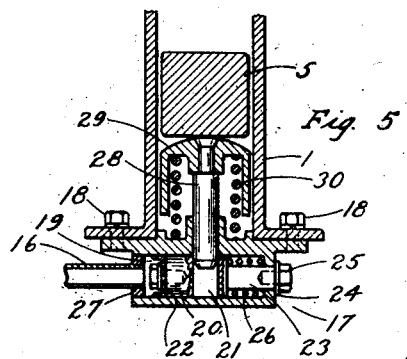
Fig. 5
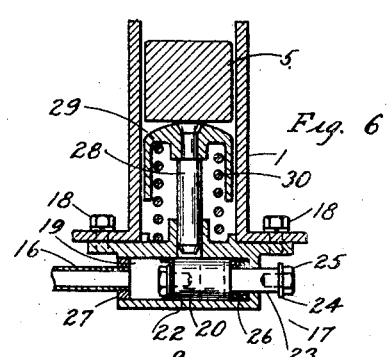
Fig. 6
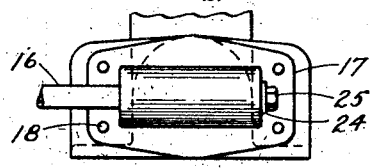
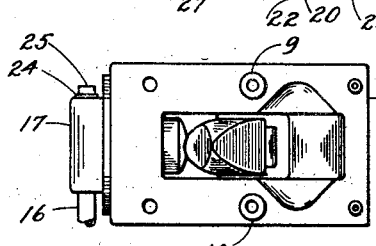
Fig. 8
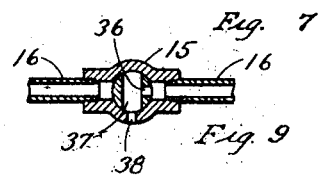
Fig. 9
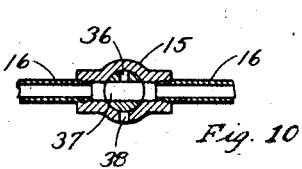
Fig. 10
Inventor
CHARLES H. TOMLINSON
By
Attorney Patented July 19, 1927.

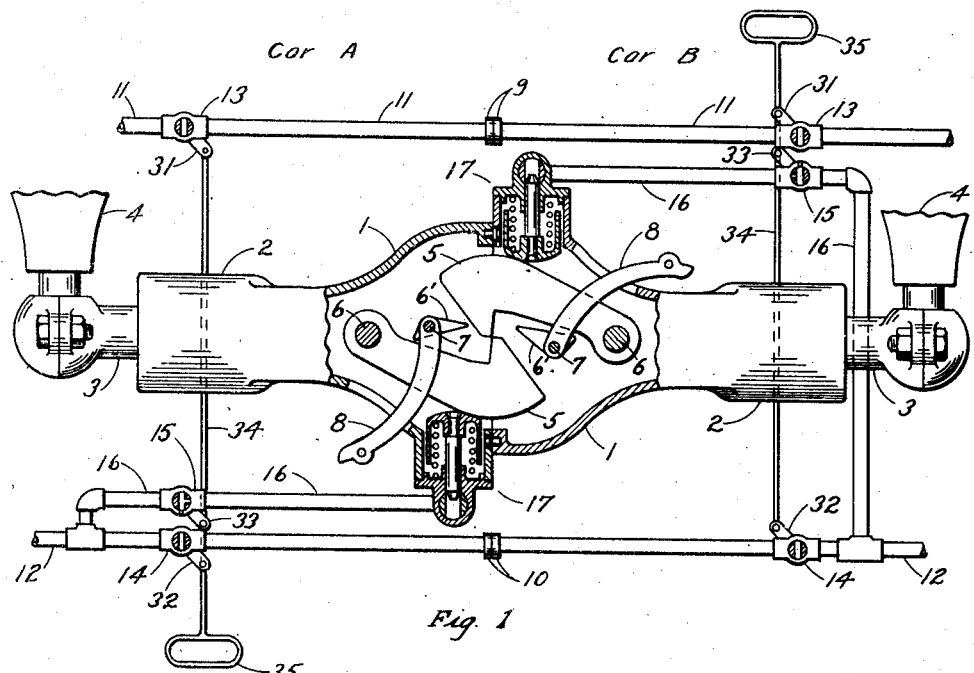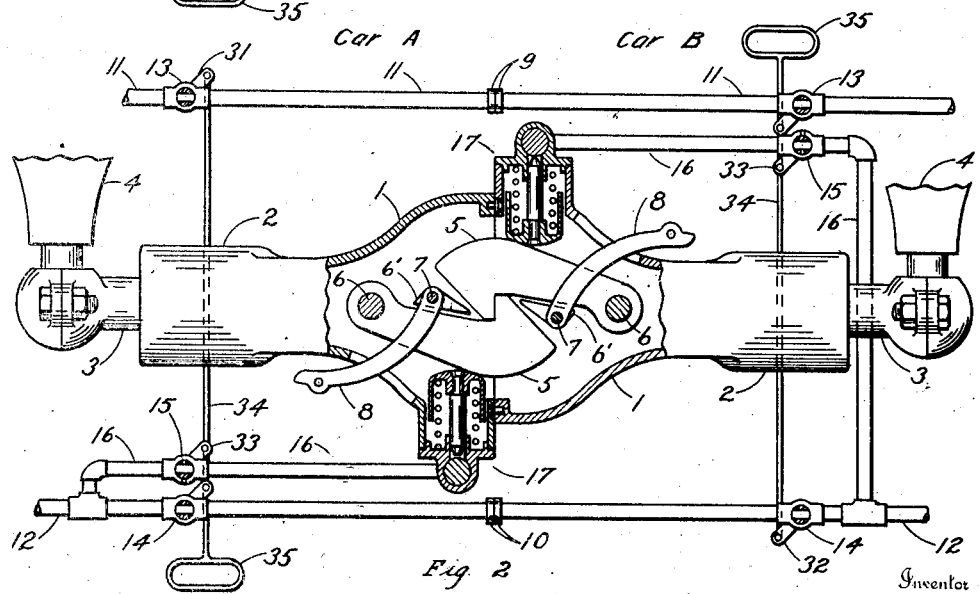

1,636,157

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

CAR AND AIR COUPLING MECHANISM.

Application filed September 25, 1924. Serial No. 739,813.

My invention relates to a car and air coupling system and particularly to cars equipped with air brake systems of any of the well known types.

One object of my invention is to prevent the uncoupling of the cars after the air coupling has been completed from car to car.

It will be apparent that my invention can also be applied to cars which are not equipped with air brake systems, but which may have, however, a source of air for other purposes or for use with my invention only and forming a part thereof.

Most cars at the present day are equipped with air brake systems of the automatic, semi-automatic and other types of which there are many modifications, the majority, however, being of those types in which the air brakes are automatically set upon the unintentional parting of two coupled cars and which is known as an emergency application of the brakes. Most of the systems require one or more fluid-pressure lines extending from one car to the coupled car, and one or more of these fluid-pressure lines may be connected to the source of air supply and be charged with full air pressure. I make use of this fact in my invention and employ the air pressure from such source of constant air pressure with the operation of a pneumatically controlled locking mechanism, and I also interlock the pneumatically controlled mechanism with the air brake system such that the pneumatic controlling means is operative to prevent the uncoupling of two cars when the fluid-pressure lines between two cars are charged with fluid-pressure, as would be the case upon completing the fluid-pressure connection between two coupled cars.

My invention resides in the new and novel construction, combination and relation of the various parts hereinafter described and shown in the drawings accompanying this specification.

In the drawings accompanying this specification:

Fig. 1 is a schematic view of two car couplers provided with mechanical interlocking means, fluid-pressure coupling means, valves for controlling the same and pneumatic controlled means for preventing the relative movement of the mechanical interlocking means and valvular means for controlling the pneumatic controlled means. In this figure the mechanical interlocking means are shown as moved to their non-interlocking position, as would be the case the instant prior to the couplers being brought to their coupled relation, or when the mechanical interlocking means have been moved to their uncoupled relation by the operator in order to bring about an uncoupling of the cars.

Fig. 2 is a schematic drawing similar to Fig. 1, but with the mechanical interlocking means in a coupled relation and the means for preventing the uncoupling of the couplers in a locked position.

Fig. 3 is a somewhat enlarged view of the mechanical inter-coupling member and the pneumatically controlled locking member in the position as shown in Fig. 1.

Fig. 4 is an enlarged view of the mechanical intercoupling member and pneumatically controlled locking means shown in Fig. 2.

Fig. 5 is a sectional view on the line 5—5 of Fig. 3.

Fig. 6 is a sectional view on the line 6—6 of Fig. 4.

Fig. 7 is a side view of the pneumatically controlled locking means.

Fig. 8 is a face view of the couplers as shown in Figs. 1 and 2.

Fig. 9 is a sectional view of the valve controlling the operation of the pneumatically controlled lock in one position whereby air pressure is shut off to the pneumatic lock and the conduit leading thereto is open to the atmosphere.

Fig. 10 shows another view of the valve in Fig. 9 under normal operating condition, that is, when the pneumatic lock is performing its locking function.

It will be readily understood that Figs. 1 and 2 being schematic drawings, do not show the specific relation of all of the parts, as for instance, the air coupling parts are shown in Fig. 8 as being in the face of the coupler on a vertical center line in place of being positioned at the side of the coupler head.

It will also be apparent in describing the preferred embodiment of my invention that a number of modifications may be made therein without effecting the operation of the same or departing from the spirit of my invention, and to attempt to cover herein the many modifications which occur to the applicant would require a large number of figures and an extended description thereof.

In Figs. 1 and 2 I have shown two coupler heads A and B in coupled relation and these are presumed to be mounted upon the adjacent ends of two cars equipped with a pneumatic system for operating air brakes. In each of these couplers is shown a body member 1 provided with a draft gear 2 and a tail piece 3 which is connected to an anchorage casting 4 of any of the well known designs, and which in turn is secured to the car body. The members 3 and 4 are constructed as shown with a ball connection thereby giving freedom of movement of the couplers relative to the car body in all directions. I have not shown the draft gear 2 in detail, as there are many standard types upon the market and the specific form of draft gear does not form a part of my invention. A car and air coupler as herein described is shown in United States Letters Patent No. 1,094,612, issued to me April 28, 1914.

The body member 1 is hollow and has mounted therein a mechanical interlocking member 5 pivoted upon the pin 6 and as shown, it is necessary for both interlocking members 5 to be moved relative to each other in order to effect an uncoupling. The movement of the interlocking members is brought about by operating the cam 6' which acts upon both interlocking members 5 and pivots about the pin 7 when the handle 8 is moved in the proper direction. It will be observed that it is necessary to operate the cam in one coupler only in order to move the interlocking members 5 on both cars. This construction, of course, could be modified so that the cam 6' would operate the uncoupling member 5 in either coupler only, as will be readily observed, by merely omitting that part of the cam 6' which engages one or the other of the interlocking members 5. Such a construction would require the movement, however, of both cams to effect an uncoupling.

Positioned relative to the face of the body member 1 are the fluid-pressure couplers 9 and 10 arranged to cooperate on the two heads, and these are usually yieldable gaskets positioned in the face of the coupler, as shown in Fig. 8. Leading from the couplers 9 and 10 are conduits 11 and 12, which in turn connect with the necessary pneumatic air brake system upon the car. Positioned in the conduits 11 and 12 are the valves 13 and 14 for controlling communication through the couplers 9 and 10 by opening or closing the conduits leading to the couplers 9 and 10. Positioned at one side of each coupler A and B is shown a pneumatically controlled lock positioned to engage the interlocking member 5 on that coupler and this lock is connected to the fluid-pressure pipe 12 through the pipe 16, which in turn is controlled by the valve 15. I prefer to connect the pipe 16 to that fluid-pressure pipe of the brake system, usually shown as the reservoir line, for the reason that this is generally the line which is normally under full air pressure. If neither of the pipes 11 or 12 are normally under full pressure, then the pipe 16 is connected to the source of air pressure supply.

The construction of the pneumatically controlled lock can probably be better understood by considering the drawings, Figs. 3 to 7, inclusive. This lock comprises a body member 17 adapted to be secured to the coupler body 1 by means of bolts or other fastening means 18. The body member is provided with a bored cavity 19 in which is positioned a reciprocating plunger 20 provided with a transverse opening 21 and having at one end an air packing 22 and at the other end a reduced portion 23, which passes through the end wall 24 and which acts as a guide for the plunger 20. To the end of the reduced portion 23 is a bolt and washer 25 which prevents the movement of the plunger 20 in one direction under the action of the spring 26. When the lock device is not acting as a lock the plunger 20 is in the position shown in Fig. 5. The plunger recess 19 is closed at one end by means of the plug 27 in which is the pipe 16 connected to the source of air pressure supply.

It will be evident that when the pipe 16 is charged with air through the opening of the valve 15 that the plunger 20 will be moved in one direction against the tension of the spring 26 if there is no interference to said movement, and when the plunger 20 has been moved under air pressure it will assume the position shown in Fig. 6. The body member 17 is provided with a transverse opening which coincides with the transverse opening 21 in the plunger 20 when the plunger 20 is in the position shown in Fig. 5 and mounted in this opening in the body member 17 is a plunger 28 which has secured to one end thereof an inverted cup shaped member 29 adapted to engage with the interlocking member 5 and hold in yielding engagement therewith by the spring 30 positioned between the members 17 and 29.

By observing Fig. 4, it will be noted that the plunger 28 does not interlock with the plunger 20 when the interlocking members 5 are in their normal position and therefore, when the interlocking member 5 is in normal position the plunger 20 is free to reciprocate either under the action of fluid-pressure or the spring 26. It will be noted from Figs. 3 and 5 when the interlocking member 5 has been moved to an uncoupling position with the plunger 20 in its normal position, that the plunger 28 is free to enter the transverse passage 21 in the plunger 20 and that when this takes place, the plunger 20 cannot be moved by air pressure and it will also be observed from Figs. 4 and 6 that when the plunger 20 has been operated under air pressure, that the plunger 20 and the transverse opening 21 do not coincide, and that it is impossible then to move the members 28 and 29 against the spring pressure 30 and hence it is impossible to move the interlocking member 5 to an uncoupled position. It will also be observed that as long as air pressure maintains the plunger 20 in the position shown in Fig. 6, that the interlocking member 5 cannot be moved to an uncoupling position either through operation of the cam handle 8 or through any tendency of the interlocking members 5 to creep apart.

The valves 13, 14 and 15 are each provided with handles 31, 32 and 33 respectively and these handles are connected by means of a rod 34 provided with a handle 35 so that whenever the handle 35 is moved in one direction or the other, the control valves are also moved and they are moved simultaneously, and it will also be observed that there will be simultaneous movement through each of the pipes 11, 12 and 16 or vice versa. From this, it will be observed that whenever communication through the fluid-pressure couplers 9 and 10 is established, that the air pressure will also be established in the pipe 16 and the plunger 20 moved to the position shown in Fig. 6 and the interlocking member 5 will be locked or held against uncoupling, and this condition will remain until communication through the couplers 9 and 10 has been discontinued by the closing of the valves 13 and 14, and when this closing takes place then communication in the pipe 16 will be closed and that portion of the pipe between the valve 15 and the pneumatically controlled mechanism will be drained through the ports 36, 37 and 38 thereby permitting the plunger 20 to be moved back to normal position shown in Fig. 5 under action of the spring 26.

The member 29 being normally pressed against the interlocking member 5 through the action of the spring 30 will tend to normally hold the interlocking member 5 in its normal or coupled relation with the arrangement as shown in Figs. 1 and 2, and any uncoupling that takes place will be against the action of the spring 30 when the pneumatic lock is positioned as shown in Figs. 3 and 5.

It will be apparent that if only the car A was equipped with a pneumatic locking device and the car A was equipped with a source of air pressure supply for the operation of the pneumatic locking device only, that with the construction of mechanical couplers shown, this single locking device on the car A would be sufficient to prevent the uncoupling of the cars prior to the time intended, for the reason that it is necessary that both interlocking members 5 should be moved to effect an uncoupling.

When two cars are brought together the fluid-pressure couplers 9 and 10 will be coupled and the mechanical coupling will be made and the interlocking members 5 will automatically interlock upon impact of the couplers, and will hold not only the cars in coupled relation, but also the fluid-pressure couplers 9 and 10. If the car A is the forward car and is equipped with air pressure supply apparatus, then upon the operator moving the handle 35 in the proper direction the valves 13, 14 and 15 will be simultaneously opened, completing the fluid-pressure circuit through the couplers, also to the locking mechanism, and the same will be operated to the position shown in Fig. 6 and as long as air pressure remains upon the locking mechanism, it will be impossible for the interlocking members 5 to move to a non-interlocking position. Upon operating the handle 35 in the car B, the fluid-pressure circuits will be completed in both cars and ready for operation. If both cars are equipped with a source of air pressure supply then, of course, the operation of the handle 35 on either car will operate the locking mechanism on that car and prevent any movement of the members 5.

In order to uncouple, it will be necessary for the operator to move both handles 35, if both cars are equipped with a source of air supply, or to move the handle 35 on that car only which is equipped with air pressure, if only one car is so equipped, and close the valves in the air lines 11, 12 and 16. Having done this, the handle 8 can then be operated to move the interlocking members 5 against the action of the spring 30, as shown in Figs. 1, 3 and 5.

Having described my invention, I claim:

1. In a system of car and air coupling devices on two cars, the combination therewith of a source of fluid pressure, valves controlling the flow of fluid pressure to the air coupling devices, pneumatic operated means to prevent the car coupling devices uncoupling when the controlling valves are open and means to automatically supply air pressure to pneumatic means when the controlling valves are open and the car couplers thus prevented from uncoupling.

2. The combination with a pair of coupled car couplers, of air coupling means, valves controlling the flow of air to said air coupling means, means on each coupler interlocking with each other to hold the car and air coupling means in coupled relation and pneumatic operated means acting on the interlocking means while the controlling valves are open to prevent the uncoupling of the interlocking means.

3. In a coupling system, the combination with a car coupler of an air coupler connected to a source of air supply, a valve to control the flow of air through the air coupler, and pneumatic operated means while under air pressure to prevent the car couplers being uncoupled while the controlling valve is open.

4. In a coupling system, the combination with a car coupler of an air coupler, a valve controlling the flow of air through the air coupler, pneumatic operated means to prevent the uncoupling of the car coupler when the air coupler is functioning, a valve to control the operation of the pneumatic means and means interlocking the valves so that the valves will move to their open or closed positions substantially simultaneously.

5. The combination with a pair of coupled car couplers, of an air coupling means, valves controlling the flow of air through the air couplers, means on each coupler interlocking with each other to hold the car and air couplers in a coupled relation, holding means acting on the interlocking means to prevent the uncoupling of the interlocking means while the controlling valves are open and means automatically operating by fluid pressure to control the operation of the holding means and maintain it in fixed engagement with the interlocking means as the control valves are moved to an open position.

6. The combination with a pair of coupled car couplers each provided with cooperating pivotally mounted interlocking means to hold the couplers in coupled relation and uncoupling means to move the interlocking means to an uncoupled relation, of pneumatically operated means on one coupler to engage with the interlocking means on that coupler to prevent the interlocking means on the two couplers being moved to their uncoupled relation by the operation of the uncoupling means.

7. A car coupler comprising in combination a body member, means to attach the body to a car, an interlocking member pivotally mounted upon the body member, means to move the interlocking member, a yieldable plunger engaging the interlocking member to hold the same in its normal position, a pneumatic operated member to engage with the plunger to prevent the plunger yielding sufficiently to permit the interlocking member being moved to an uncoupled position when coupled with a counterpart coupler.

8. Controlling means for air pressure lines between two cars comprising a valve in each car for controlling the air lines, automatic locking means operated by impact of the cars for holding the air lines in coupled relation, holding means for maintaining the locking means in locked relation, valvular means in each car for controlling the holding means and means for interconnecting the valvular means for simultaneous manual operation.

9. The combination with a mechanical coupler, of air coupling means, pneumatic controlled means to control the uncoupling after a mechanical coupling has been made and means to simultaneously control the operation of the pneumatic controlled means and the air coupling means to supply air to both simultaneously.

10. In car and air couplers, the combination with a car coupler which is interlocked upon impact of the coupler heads, of air connecting means comprising contacts engaged upon impact and circuits leading therefrom and which cooperate with corresponding parts when the car coupling is made, pneumatic controlled means preventing the uncoupling of the car couplers during a predetermined time and means controlled by manual operation for simultaneously completing the air connections through adjacent coupler heads and to the pneumatic controlled means after the car coupling is made.

11. The combination with a car coupler provided with means to inter-couple with a cooperating coupler, of a reciprocating device yieldably resisting the movement of the inter-coupling means to an uncoupled position and pneumatic operated means movable into the path of the reciprocating device to prevent the movement of the reciprocating device to in turn prevent the movement of the inter-coupling member to an uncoupled position.

12. In a system for controlling the coupling of cars and fluid pressure lines for trains, a pair of fluid pressure lines, coupling means operable by the movement of the cars for automatically coupling and holding said cars and fluid pressure lines in coupled relation, valvular controlling means in each of the fluid pressure lines to open and close the said lines, spring and fluid pressure controlled means to engage the coupling means to prevent the premature uncoupling of the cars and the fluid pressure lines and valvular controlling means for the last said means, the several valvular controlling means being separate and spaced apart and inter-connected for simultaneous operation.

13. The combination with a mechanical car coupler provided with interlocking means, of a pair of elements coacting to prevent the interlocking member on the car coupler moving to a non-interlocking position when coupled to a similar device, one element being spring held and operated by air pressure to prevent the movement of the other element, also spring held and normally engaging the interlocking member to prevent the movement of the interlocking member to a non-interlocking position when air pressure is applied to the one element.

14. A locking device comprising in combination a spring held element to normally engage a pivotally mounted mechanical interlocking mechanism on a car coupler, a plunger mounted in a cylinder and adapted to cooperate with the said element to prevent or allow the movement of the said element against its spring tension and means to control, at will, the operation of the plunger.

15. A locking device for a mechanical car coupler comprising in combination a cylinder and a reciprocating element mounted therein to engage the coupler hook, a plunger operable transversely to the said element, means on said element to cooperate with means on the plunger to permit the said element and plunger to inter-engage when the plunger is in one position and means to prevent inter-engagement when the plunger is in another position and means to move the plunger at will, to either position.

16. A locking device for a car comprising in combination a cylinder mounted on the coupler, a plunger reciprocally mounted in the cylinder, a spring to move the plunger in one direction, means to apply air pressure to the cylinder to move the plunger in the other direction, a transverse opening in the plunger, a reciprocating element mounted to move transversely to the plunger and having a part to be moved into and out of the opening in the plunger and a spring to normally and yieldingly hold the said element out of interlocking engagement with the plunger.

In testimony whereof I affix my signature.

CHARLES H. TOMLINSON.